(No Model.)  4 Sheets—Sheet 1.

W. B. PAGE & B. HAUSHEER.
SOLDERING MACHINE.

No. 580,554. Patented Apr. 13, 1897.

(No Model.) 4 Sheets—Sheet 2.
W. B. PAGE & B. HAUSHEER.
SOLDERING MACHINE.
No. 580,554. Patented Apr. 13, 1897.
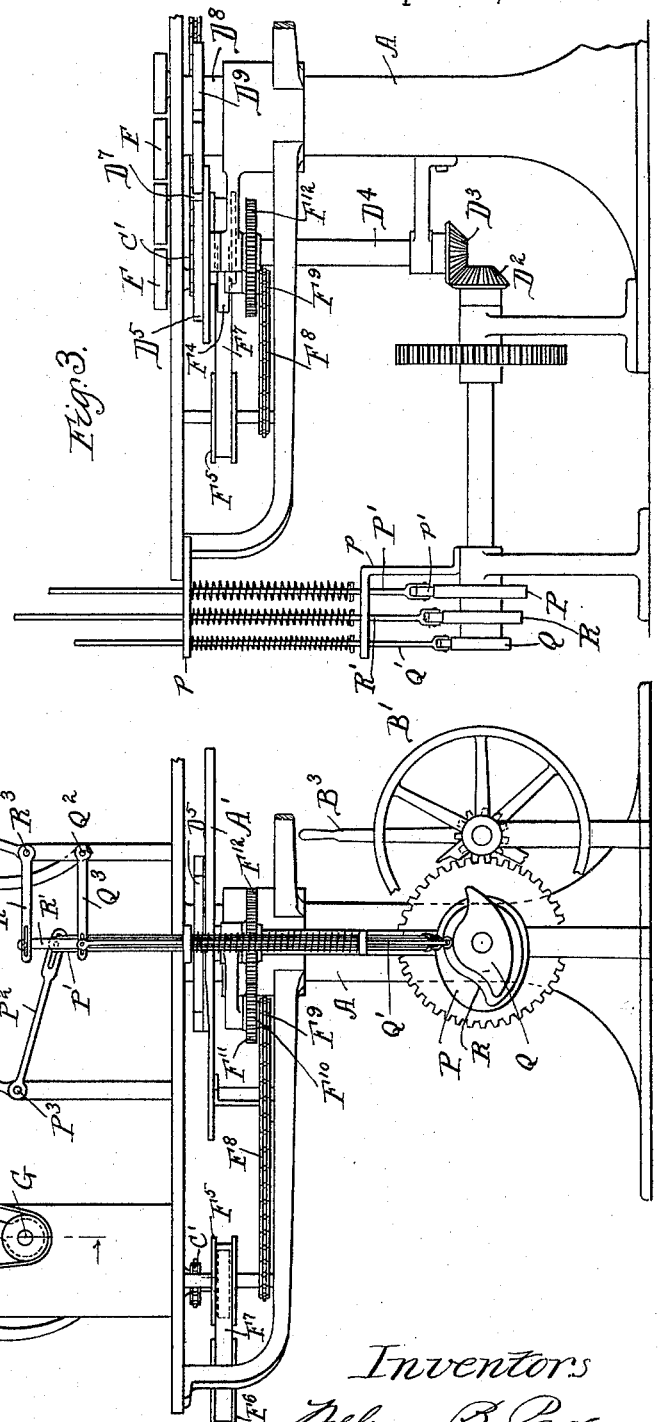
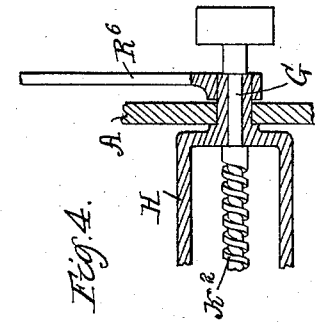
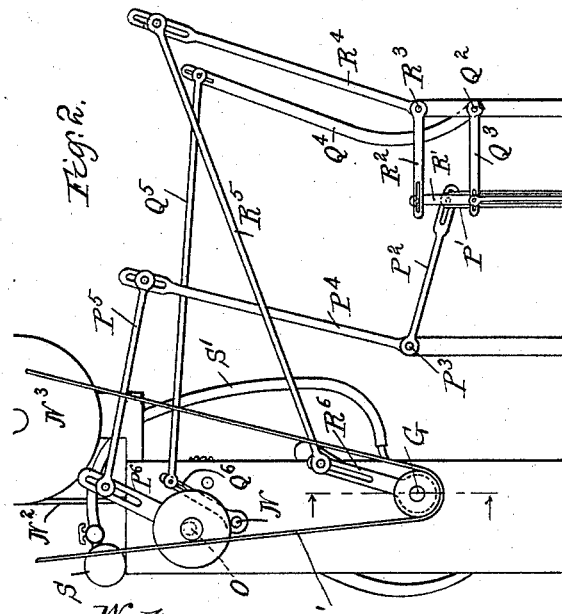
Witnesses.
Inventors
William B. Page
Bernhard Hausheer
by Walter H. Chamberlin
Atty.

(No Model.) 4 Sheets—Sheet 3.
W. B. PAGE & B. HAUSHEER.
SOLDERING MACHINE.
No. 580,554. Patented Apr. 13, 1897.
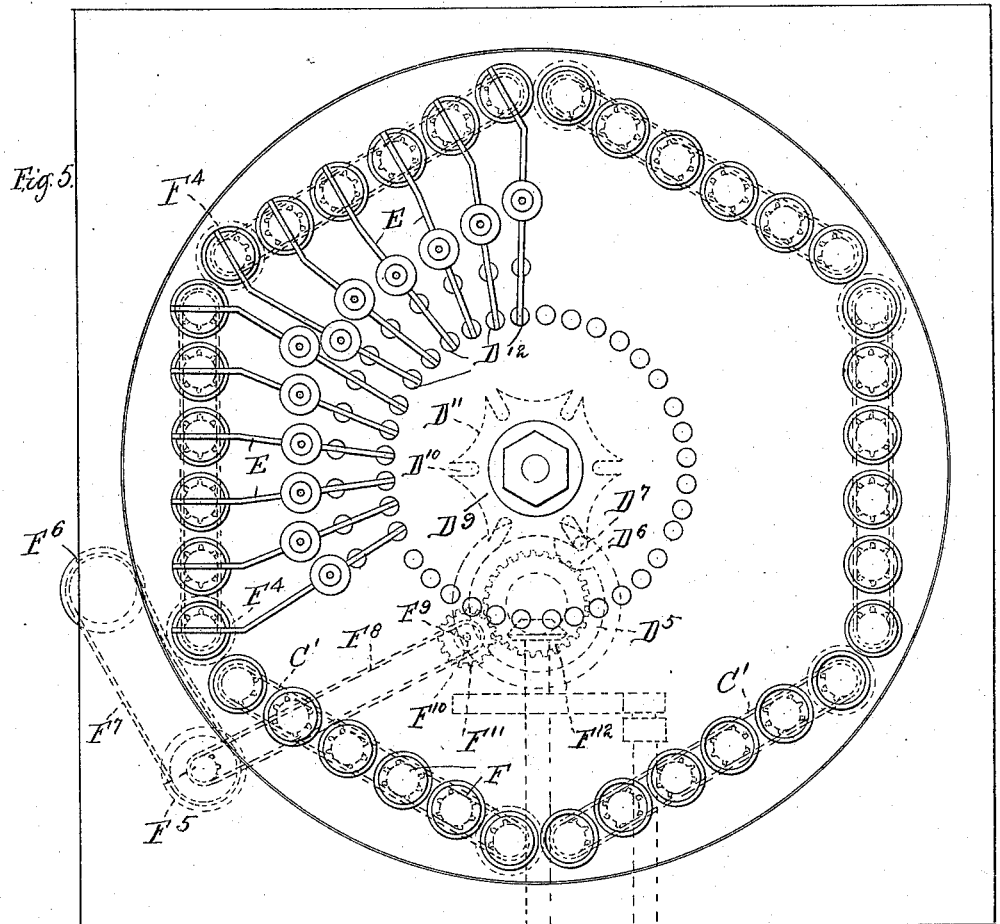
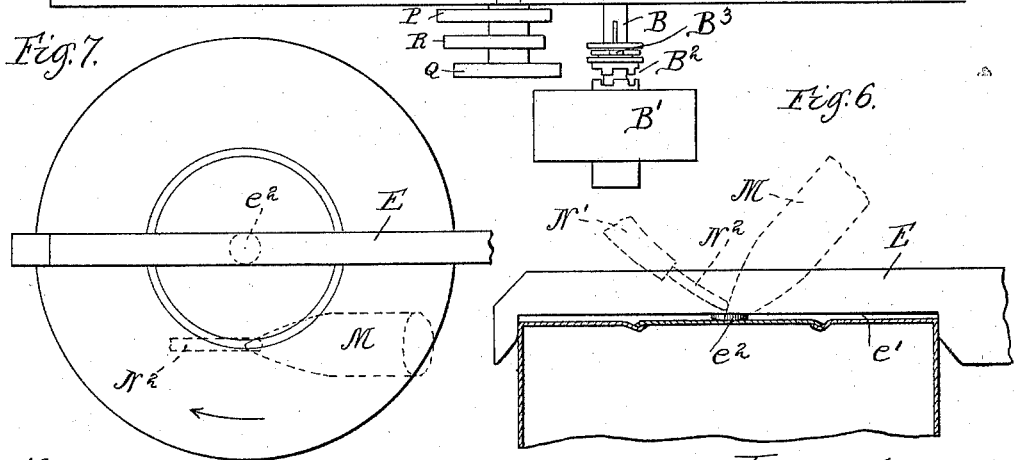
Witnesses.
Inventors (No Model.) 4 Sheets—Sheet 4.
W. B. PAGE & B. HAUSHEER.
SOLDERING MACHINE.

No. 580,554. Patented Apr. 13, 1897.

Witnesses.

Inventors
William B. Page
by Bernhard Hausheer
Walter H. Chamberlin
Atty

UNITED STATES PATENT OFFICE.

WILLIAM B. PAGE AND BERNHARD HAUSHEER, OF DIXON, ILLINOIS, ASSIGNORS TO THE ANGLO-SWISS CONDENSED MILK COMPANY, OF CHAM, SWITZERLAND.

SOLDERING-MACHINE.

SPECIFICATION forming part of Letters Patent No. 580,554, dated April 13, 1897.

Application filed January 25, 1896. Serial No. 576,778. (No model.)

*To all whom it may concern:*

Be it known that we, WILLIAM B. PAGE and BERNHARD HAUSHEER, citizens of the United States, residing at Dixon, county of Lee, State of Illinois, have invented a certain new and useful Improvement in Soldering-Machines; and we declare the following to be a full, clear, and exact description of the invention, such as will enable others skilled in the art to which it pertains to make and use the same, reference being had to the accompanying drawings, which form a part of this specification.

Our invention has for its object the production of a soldering-machine adapted perhaps more particularly for soldering in place the caps in the ends of cans, although obviously it might be employed for soldering at any point where the principle which we employ is applicable.

Heretofore the chief difficulty with the "capping-machines" (the term applied to machines adapted to solder the caps in the ends of cans) has been that they scorched the contents of the can, the latter being necessarily placed in the can before the cap is placed in position. In working with some classes of goods this liability of scorching is not so material, but where the cans are filled with condensed milk or similar substances, where our machine has heretofore been employed, the utmost care must be taken in this respect. Our particular aim, therefore, is to produce a machine where a minimum amount of heat is applied to the seam.

Essentially the invention consists in the provision of a pointed or substantially pointed soldering-iron, which by suitable mechanism is brought to the seam to be soldered and the parts moved one with respect to the other, so that the iron is carried over the seam and the solder melted therein. There are other features and combination of parts hereinafter described and claimed.

Figure 1:
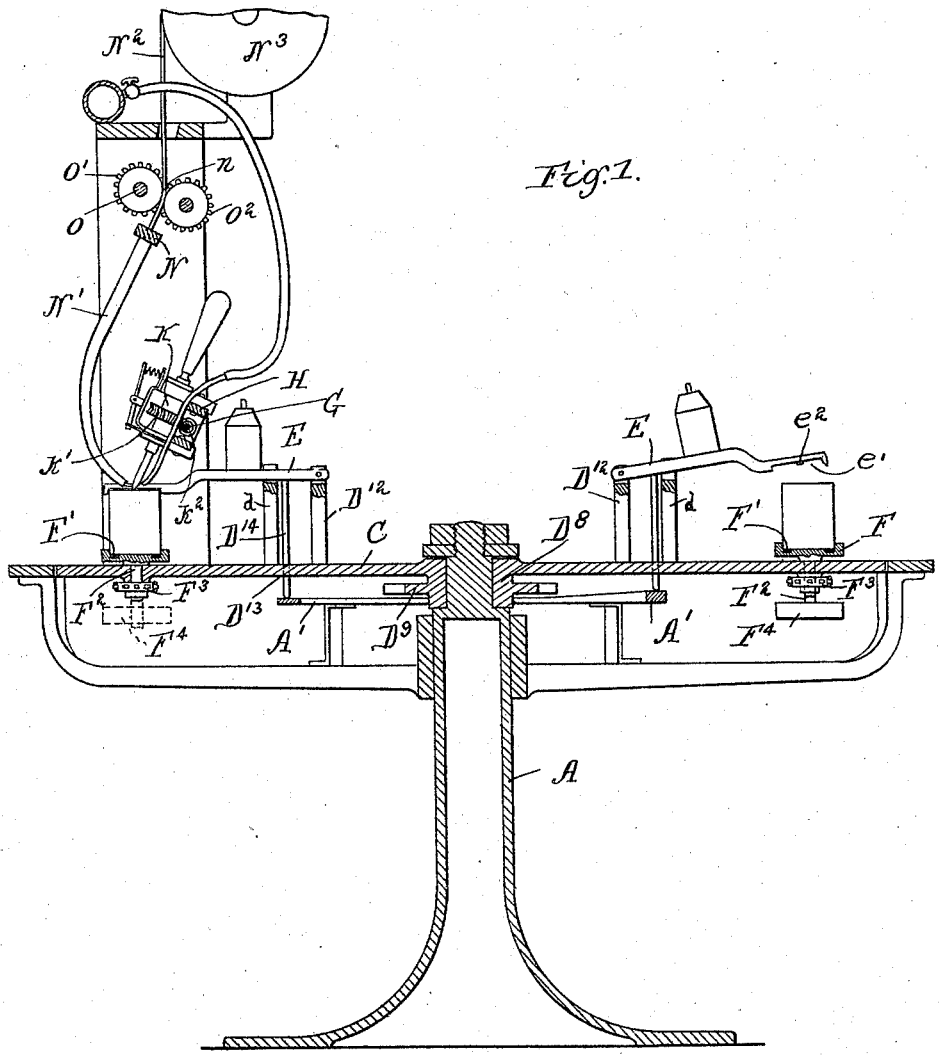
Figure 8:
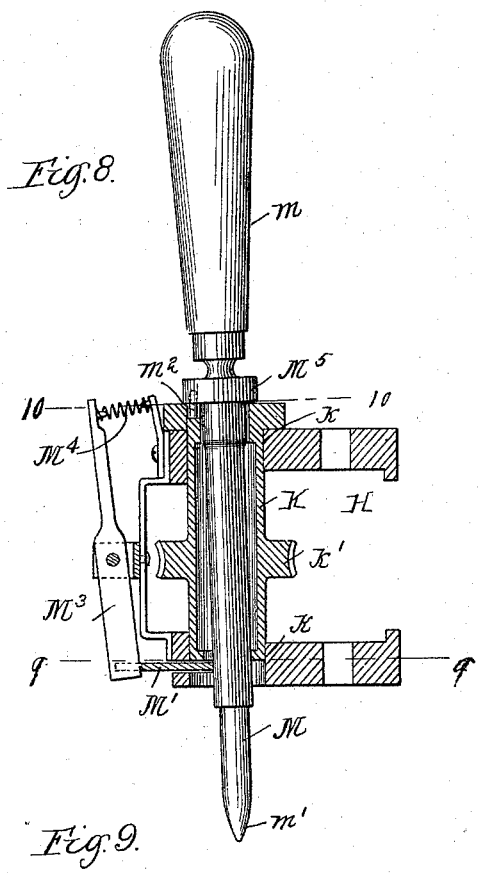
Figure 9:
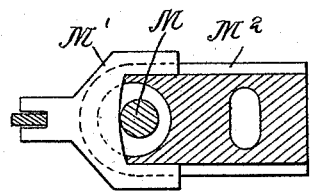
Figure 10:
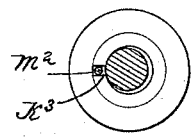

In the drawings, Figure 1 is a vertical section of the machine with some of the parts removed. Fig. 2 is a side elevation of a portion, showing the operating-cams and their connections. Fig. 3 is a rear elevation of the same. Fig. 4 is a detail section of the shaft for revolving the soldering-irons. Fig. 5 is a plan view of the carrying-table. Figs. 6 and 7 are enlarged details showing the relation of the soldering-iron to the seam. Fig. 8 is a detail of the soldering-iron and accompanying mechanism. Fig. 9 is a section on the line 9 9 of Fig. 8. Fig. 10 is a section on the line 10 10 of Fig. 8.

In carrying out the invention, A represents a suitable main standard or frame on which the operative parts are supported.

B is the main drive-shaft, with a drive-pulley $B'$ engaged thereto by any suitable clutch $B^2$, with a handle $B^3$ for throwing the pulley into and out of engagement with the shaft.

C is a revolving table for carrying the cans. This table is revolved intermittently by what is well known as the "Geneva movement," (shown in Figs. 3 and 5,) as follows: A bevel-gear $D^2$ on the shaft B meshes with the gear $D^3$ on the vertical shaft $D^4$. On the upper end of the latter is a circular disk $D^5$, with a circular recess $D^6$ in its periphery and a pin $D^7$ in the recess. On the shaft $D^8$ of the table C is a disk $D^9$, having in its periphery alternately-arranged slots $D^{10}$ and rounded recesses $D^{11}$. The disk $D^5$ is continuously revolving until the pin $D^7$ engages in the slot $D^{10}$, when the disk $D^9$ will be revolved, carrying with it the table C, until the pin rides out of the slot. This intermittent motion of the table C gives the operator an opportunity to remove from the table the sealed cans and place therein the cans with the caps thereon to be sealed.

Carried by the table C is a series of posts $D^{12}$, and pivoted in each post is an arm E. Adjacent to each post $D^{12}$ is a post $d$, having the upper end slotted to receive the arm. Adjacent to each post $D^{12}$ is a socket $D^{13}$, carrying a loose pin $D^{14}$, the lower end adapted to rest and slide on a stationary cam-track $A'$ on the frame, while the upper end is underneath the arm, with the latter resting thereon. Thus as the table C is revolved and the pins $D^{14}$ raised and lowered by the cam $A'$ the arms will be tilted. The outer end of each arm is shaped with a recess $e'$ on its under side adapted to fit over the can, and with a pin $e^2$ in said recess adapted to bear on the can-cap and hold the latter in place.

In the table C, arranged near the periphery, are several sets of revolving disks F, there being as many disks to each set as there are soldering-irons. At this point we will explain that in this application we have shown and described a construction wherein six cans may be simultaneously soldered. Thus the table C when it moves carries six finished cans away from the soldering mechanism and carries six more to it. The revolving disks F above referred to have their surfaces preferably provided adjacent to the periphery with a strip of rubber F'. On the shaft $F^2$ of each disk is a sprocket-wheel $F^3$, the sprocket-wheels of each set being connected together by a sprocket-chain C'. The shaft $F^2$ of the disk at the end of each set is provided with a friction-wheel $F^4$.

$F^5 F^6$ are two band-wheels mounted on shafts extending from the frame, with a band $F^7$ passing around them. The band-wheel $F^5$ is driven by a chain $F^8$, passing around a sprocket-wheel $F^9$ on the counter-shaft $F^{10}$, the latter having a pinion $F^{11}$, that meshes with a gear $F^{12}$ on the shaft $D^4$. Thus as each set of disks carrying cans reaches the front of the machine, the friction-wheel $F^4$ coming into contact with the belt $F^7$, each disk in that set is revolved, thus revolving the cans.

On the front of the machine is a shaft G, continuously revolved by the band G', connected with an overhead pulley. On this shaft is a rocking frame H, carrying the soldering-irons. We will describe one of these in detail, as shown in Fig. 8.

K is a cylinder supported from the frame H and revolving in the bearing $k$. On said cylinder is a worm-gear $k'$, that meshes with a worm $k^2$ on the shaft G.

M is the soldering-iron, having a handle $m$ and a soldering-point $m'$. It is necessary that this soldering-point should ride into the groove around the cap, and to enable the point to adjust itself to any discrepancy in the position of the can we make the iron somewhat smaller in diameter than the cylinder, so that the soldering-point may have some play, and we hold the point down to its work by the yoke M', working in the bearing $M^2$, the yoke being held down by the lever $M^3$ and spring $M^4$. To insure the revolution of the iron with the cylinder K, we provide on the shank $M^5$ of the iron a pin $m^2$, which enters a slot $k^3$ in the cylinder. It will be seen that any one or more of the irons can at any time be removed without interfering with the operation of the others.

We will now describe the solder-feed. N, Fig. 1, is a tilting bar or rack pivoted in the main frame A, carrying tubes N', there being one for each soldering-iron. These tubes are preferably wrapped with asbestos or other heat non-conductor to prevent the solder from melting before it reaches the iron. The wire of solder $N^2$ is fed from a rack $N^3$ down through the tube N'. The tubes when tilted down terminate adjacent to the point where the soldering-iron rests on the seam, and as the solder is forced out of the tube it comes in contact with the hot iron, is melted, and runs onto the seam of the can.

The mechanism for feeding the solder is as follows: A shaft O is provided adjacent to the upper end of each tube N' with a gear O', having a certain width of its periphery serrated, as at $n$. Meshing with the gear O' is another gear $O^2$, also having a serrated face. The wire passes between the two serrated faces and the revolution of the gears forces the solder down. The shaft O and gears are revolved by a cam P on the main shaft. A rod P', held in any upright position by suitable bearings $p$, has on its lower end a roller $p'$, which bears on the cam P. The upper end of the rod P' is pivoted to an arm $P^2$ on the shaft $P^3$. Another arm $P^4$ on the shaft $P^3$ is connected by the rod $P^5$ with the arm $P^6$ on the shaft O. The arm $P^6$ is connected with the shaft O by any suitable clutch, so that the rocking of the arm in one direction will revolve the shaft, but when it is tilted in the opposite direction the shaft is unmoved. Thus the shaft O is given an intermittent motion to feed the solder. Since any form of clutch may be used, no specific form is shown and no specific form is claimed.

We will now describe the mechanism for giving the tubes a tilting motion to carry the lower ends toward or away from the soldering-irons. Q is a cam on the main shaft; Q', a vertically-movable rod suitably journaled in the frame; $Q^2$, a shaft; $Q^3$, an arm thereon pivoted to the rod; $Q^4$, another arm on the shaft; $Q^5$, a rod connecting the arm $Q^4$ with an arm $Q^6$ on the bar or rack N. A similar set of mechanism, consisting of a rod R', arm $R^2$, shaft $R^3$, arm $R^4$, rod $R^5$, and arm $R^6$, connects the cam R with the rocking frame H to tilt the latter and carry the soldering-irons to and from their work.

The operation is as follows: The operator places on their several disks on the table C six cans. The revolution of the table carries the cans to the front of the machine, where, as above explained, the cans are revolved. Simultaneously with the arrival of the cans under their respective soldering-irons the irons and solder-carrying tubes are tilted down by the cams Q R until the iron rests in the groove around the cap and the solder-wire projects from the lower end of its tube close to the iron. The cam P now operates the solder-feeding mechanism and enough solder is forced against the iron and melted to effect the sealing of the joint. As above explained, the can is revolving so that the solder is spread on the entire seam. Somewhat over a complete revolution of the can is necessary to effect this, and then the feed of the solder stops and the cam Q, through its accompanying mechanism, tilts the ends of the tubes away. Somewhat more than an additional revolution is then given the can with the iron still in the seam to effectively melt and seal the solder in place. The cam R then tilts the iron away from the cans. By this time the pin $D^7$ on the disk $D^5$ has revolved so that it engages in a slot $D^{10}$ in the disk $D^9$ and revolves said disk, carrying with it the table and the six cans operated upon. This same movement carries six new cans under the irons and the same operation is repeated. In order that the pin $e^2$, which holds the cap in place, may always rest in the center of the cap and at the same time be clear of the soldering-iron, it is necessary to give the outer ends of the arms E a peculiar shape, depending on the relative position of each when in front of the machine.

To heat the soldering-irons, we provide a pipe S, to which is led a suitable blast of combined air and gas, and tubes S', (flexible at one point to permit the frame to rock,) extending down to a point adjacent to the coppered soldering end of the soldering-iron.

It is obvious that a machine can be constructed to operate simultaneously on a greater or less number than six; also, that many of the details of construction can be altered or omitted at will without departing from the invention.

What we claim is—

1. In a soldering-machine the combination of a substantially pointed soldering-iron, mechanism for moving the iron and seam relatively and simultaneously to bring the iron into contact with the entire seam and mechanism for simultaneously feeding a continuous wire of solder directly to the point where the iron engages the seam, substantially as described.

2. In a soldering-machine the combination of a soldering-iron adapted to engage the seam to be soldered at substantially a single point, means for revolving the can to bring the iron into contact with the entire seam and means for feeding a continuous wire of solder directly to the point where the iron engages the seam, substantially as described.

3. In a soldering-machine the combination of a soldering-iron adapted to revolve on its own axis and adapted to engage the seam to be soldered at substantially a single point and means for revolving the can to bring the iron into contact with the entire seam, substantially as described.

4. In a soldering-machine the combination of a revolving soldering-iron adapted to engage the seam to be soldered at substantially a single point, mechanism for carrying the iron to and from the seam, mechanism for revolving the can and mechanism for feeding a continuous wire of solder directly to the point where the iron engages the seam, substantially as described.

5. In a soldering-machine the combination of a series of substantially pointed soldering-irons, mechanism for simultaneously tilting said irons to and from the can-seam and mechanism for moving simultaneously a series of cans to bring one can under each soldering-iron, substantially as described.

6. In a soldering-machine the combination of a series of substantially pointed soldering-irons and means for revolving each iron on its own axis, each iron held to the can at an angle to the surface to be soldered, mechanism for revolving each can to bring the iron into contact with its entire seam and mechanism for simultaneously moving the entire series of cans to and from their location under the soldering-irons, substantially as described.

7. In a soldering-machine the combination of a substantially pointed soldering-iron revoluble on its own axis and held to the can at an angle to the surface to be soldered, mechanism for tilting the said iron to and from the can-seam, mechanism for carrying a solder-wire to and from the soldering-iron and means for moving the can to bring the iron into contact with the entire seam, substantially as described.

8. In a soldering-machine the combination of the following mechanisms to wit: means for carrying the can to the soldering mechanism; means for revolving the can to be soldered; means for holding the cap in place until soldered; means for bringing the soldering-iron to the seam to be soldered; means for revolving the can on its own axis; means for bringing the solder-wire into contact with the soldering-iron; means for feeding the solder; means for carrying the solder-wire away from the iron; means for carrying the iron away from the seam; and means for carrying the can away from the soldering mechanism, substantially as described.

9. In a soldering-machine the combination of an intermittently-revolving table carrying one or more revolving disks adapted to revolve the cans, means for periodically revolving the disks in one direction independent of the movement of the table and soldering mechanism above said disks, substantially as described.

10. In a soldering-machine the combination of an intermittently-revolving table provided with a series of revolving disks adapted to revolve the can, means for revolving each of said disks simultaneously in one direction but periodically and independent of the movement of the table and soldering mechanism above said disks, substantially as described.

11. In a soldering-machine a soldering-iron, a revolving cylinder in which said iron is removably placed and means for engaging the two together to cause the irons to revolve with the cylinder, substantially as described.

12. In a soldering-machine, a soldering-iron, a revolving cylinder of larger diameter than the diameter of the iron in which the latter loosely fits and means for engaging the iron and cylinder together to revolve the iron, substantially as described.

13. In a soldering-machine a soldering-iron, a revolving cylinder of larger diameter than the diameter of the iron in which the latter loosely fits, pressure mechanism for holding the point of the iron down to its work, and means for engaging the iron and cylinder together to revolve the iron, substantially as described.

14. In a soldering-machine a soldering-iron, a revolving cylinder of larger diameter than the diameter of the iron in which the latter loosely fits, spring-pressure mechanism for holding the point of the iron down to its work, and means for engaging the iron and cylinder together to revolve the iron, substantially as described.

15. In a soldering-machine a revolving worm-shaft, a revolving cylinder having a worm-gear meshing with the worm-shaft, a soldering-iron loosely fitting in said cylinder, a pin on the iron engaged in a recess in the cylinder, a yoke bearing on the lower end of the iron, and a spring-impelled lever bearing on the yoke, substantially as described.

16. In a soldering-machine a series of tilting cap-holding arms each having a recess on its outer end for engaging the upper end of the can and a pin to bear on and hold the cap, substantially as described.

17. In a soldering-machine a series of can-revolving disks connected together in sets and mounted on an intermittently-revolving table, and means for revolving each set of disks while the table is at rest, substantially as described.

18. In a soldering-machine a series of can-revolving disks mounted on an intermittently-revolving table and connected together in sets and a continuously-revolving mechanism which successively engages and revolves each set of disks, substantially as described.

19. In a soldering-machine a series of can-revolving disks mounted on an intermittently-revolving table and connected together in sets, and a continuously-revolving belt adapted to engage the spindle of at least one disk of each set when the latter is brought into contact with it by the movement of the table and thereby revolve the entire set, substantially as described.

20. In a soldering-machine a revolving worm-shaft, a cylinder having a worm-gear meshing with the worm-shaft, and a soldering-iron in said cylinder and means for engaging the cylinder and iron together so that a revolution of the worm-shaft revolves the iron on its own axis, substantially as described.

In testimony whereof we sign this specification in the presence of two witnesses.

WILLIAM B. PAGE.
BERNHARD HAUSHEER.

Witnesses:
JAMES N. STERLING,
G. B. BRUBAKER.